(12) United States Patent
Gardiner et al.

(10) Patent No.: US 7,720,306 B2
(45) Date of Patent: May 18, 2010

(54) SYSTEMS AND METHODS FOR DISPLAYING CHANGES IN BIOLOGICAL RESPONSES TO THERAPY

(75) Inventors: Allan Gardiner, Kensington, CA (US); Brent Michael McCullough, Richmond, CA (US)

(73) Assignee: Photomed Technologies, Inc., Kensington, CA (US)

( * ) Notice: Subject to any disclaimer, the term of this patent is extended or adjusted under 35 U.S.C. 154(b) by 804 days.

(21) Appl. No.: 11/512,964

(22) Filed: Aug. 29, 2006

(65) Prior Publication Data

US 2007/0091091 A1   Apr. 26, 2007

Related U.S. Application Data

(60) Provisional application No. 60/712,368, filed on Aug. 29, 2005.

(51) Int. Cl.
*G06K 9/36* (2006.01)
*A61B 5/103* (2006.01)

(52) U.S. Cl. ..................... 382/276; 600/595
(58) Field of Classification Search .................. None
See application file for complete search history.

(56) References Cited

U.S. PATENT DOCUMENTS

| | | | |
|---|---|---|---|
| 6,306,088 B1* | 10/2001 | Krausman et al. | 600/301 |
| 2004/0086194 A1* | 5/2004 | Allouche | 382/260 |
| 2005/0002546 A1* | 1/2005 | Florent et al. | 382/128 |
| 2005/0261583 A1* | 11/2005 | Satoh | 600/437 |
| 2006/0293720 A1* | 12/2006 | DiLorenzo | 607/42 |
| 2008/0240535 A1* | 10/2008 | Frangioni et al. | 382/131 |
| 2009/0247910 A1* | 10/2009 | Klapper | 600/595 |

OTHER PUBLICATIONS

Bonato, et al., "Data Mining Techniques to Detect Motor Fluctuations in Parkinson's Disease" discloses attaching EMG and ACC sensors to a human to detect body movement. Engineering in Medicine and Biology Society, 2004. IEMBS '04. 26th Annual International Conference of the IEEE. Publication Date: Sep. 2004, vol. 2, On pp. 4766-4769.*

* cited by examiner

*Primary Examiner*—Charles Kim
(74) *Attorney, Agent, or Firm*—D. Benjamin Borson

(57) ABSTRACT

Systems and methods of this invention display data using pixels with information indicated by color and intensity changes, particularly used for monitoring of physiological variables in real time. For certain methods, physiological data can be acquired by sensors, acquired data can be stored in data frames, data frames can be processed using computer-implemented methods, and processed data frames can be scaled to a display frame for display on a display device. Using such methods, a spot made up of a group of pixels can be updated during a time frame, or cycle using a computer-implemented method, such as addition, subtraction, multiplication, division or a time dependent function. Newly received data can be combined with prior received data to indicate time-dependent changes. In this way, each spot contains a cumulative history of data starting at some initial time. In other embodiments, visual contrast can be enhanced between desired data and other data. In further embodiments, two or more different types of data can be plotted together to indicate relationships between variables. Real time monitoring of signals during therapeutic treatment using light, electricity or other nerve or muscle stimuli can allow a user to monitor physiological responses during stimulation and to make rapid decisions about medical treatment.

13 Claims, 11 Drawing Sheets

SYSTEMS AND METHODS FOR DISPLAYING CHANGES IN BIOLOGICAL RESPONSES TO THERAPY

CLAIM OF PRIORITY

This application claims priority to U.S. Provisional Application No. 60/712,368 filed Aug. 29, 2005, titled: "Method to Display Changes in a Biological Response to Therapy," Allan Gardiner and Brent McCullough inventors, herein expressly incorporated in its entirety.

BACKGROUND

1. Technical Field

The present invention relates to a display, either analog or digital, of one or more signals computed to convey important information about the underlying process responsible for the signal or signals. More particularly, the present invention relates to generating a display by transforming one or more signals into a spatial relationship of two or more dimensions and processing the relationships to display important features to the viewer.

2. Related Art

The display of any function is intended to communicate information to a user. A display of signals requires the viewer to decide if a relationship exists between the signals. Interpretation is simplified when associated signals are processed before display. For an example of a well-related set of signals, an electrocardiogram can display information from each electrode's signal in parallel and display the calculated signals derived from summing two or more signals. Additionally, calculations may be used to derive averaged signals presented as short segments showing the characteristics of the bulk electrical activity of the heart which are meaningful to the cardiologist.

The problem of "what" to display becomes important in processes that are not well connected. An example poorly-connected signals, includes combined signals from an accelerometer and surface electromyograph (SEMG). An SEMG is a device used to monitor physiological activity and is attached to the skin to measure the electrical activity of a muscle. An accelerometer connected in the area affected by the muscle can measure the motion of that area. Muscle activity and accelerometer motion are related only when both sensors are placed appropriately and will be poorly-related when placed in other locations.

The conventional display on a SEMG is an analog meter, or a numerical display indicating electrical voltage. The SEMG can be hooked to an oscilloscope, or its signal provided to a personal computer to enable providing a display of voltage vs. time, and storage of the display for later reference. The time an event occurs can be "displayed" by controlling how long each data point takes to traverse the screen. Data can be displayed using an XY oscilloscope to provide some display of the time an event occurs by having a decay time for each illuminated image point or area.

It is desirable to provide an improved display for physiological activities, or for the display of a variety of other functions, to allow a user to more accurately and rapidly monitor the activity or function.

SUMMARY

Aspects of the present invention relate to systems and methods for displaying, on either analog or digital display devices, one or more signals processed to convey important information about the underlying process responsible for the signal or signals. More particularly, the present invention relates to generating a display by transforming, by means of one or more mathematical functions, one or more signals into a spatial relationship of two or more dimensions, processing those relationships, and displaying to highlight important features to the viewer. Additionally, the invention includes embodiments for processing relationships between variables to highlight differences between, for example, a data point that commonly occurs from a data point that is rare.

Data can be collected from one or more devices or sensors that provide signals related to, for example, a biological or physiological phenomenon. These signals can then be stored in a memory device along with one or more additional pieces of information, for example, the time at which the signal was collected, thereby producing a value for the sensed information at a particular time point.

For each time point, or frame to be displayed, embodiments of this invention include one or more of the following steps. Signals to be displayed can be transformed using functions and/or frequency domain representations from separate signals into a multidimensional representation of a set of data acquired at a particular time to produce a data frame. Signals can be transformed as they are received in real-time or at a later time after retrieval from storage. For each time interval, either at an arbitrary time point or at the time a data point is received, or as a continuous process. Transform of a previous data frame can then be combined with a new data frame to produce an "updated data frame."

Processes for producing an updated data frame include for example, addition, multiplication, subtraction, division, frequency domain technique such as Fast Fourier Transform, Discrete Fourier Transform, Fourier Transform, wavelet transform, or other time dependent function, such as infinite impulse response filter ("IIR") finite impulse response filter ("FIR"), median filters. These and other methods can be applied as data is collected or after it is stored, either by itself, or in combination with previously collected data to produce a new data frame. In this way, each point in a multidimensional display space can contain a cumulative history of data points starting at some initial time. Once data frames are combined, a resulting data frame can be processed using a function to scale information in the data frame to the display properties of the display device, or devices thereby producing a display frame.

A display frame can be processed further to optimize it to the capabilities of the display device, for example, by auto-scaling color, intensity, size or other visually discriminating feature to better convey information to the viewer. Before combining new and old display information, one embodiment enhances the viewability of a spot value by auto scaling a range of data to match the display range by intensity, color, or other display parameters. This method can be repeated for subsequent time frames.

Display variations can be simultaneously displayed or replayed for data collected from numerous devices, such as, in one embodiment, an SEMG, an accelerometer, and a treatment device. Real time monitoring of signals during therapeutic treatment using light, electricity, UV, acupuncture, ultrasound, magnetic field, radiation, deep brain stimulation, or other methods can benefit from systems and methods of this invention because the systems and methods allow monitoring of physiological responses while treatment is occurring in real-time so that a user can recognize a response to treatment while it is occurring. Early recognition of a response to treatment allows the user to evaluate the treatment. For example, one can decide to continue treating, modify the treatment, move to a new location or setting, or to discontinue treatment. Thus, systems and methods of this invention allow the user to rapidly recognize effective treatments and avoid, or recover from, detrimental treatments, thereby increasing treatment efficacy and safety. Simultaneous multiple displays can provide the viewer with the ability to readily recognize relationships amongst signals, which may represent computed interpretations of several signals, such as stimuli and responses to those stimuli. The computed display systems and methods of this invention can be used by practitioners having differing degrees of experience and expertise, thus reducing cost and improving the efficacy of a treatment.

BRIEF DESCRIPTION OF THE DRAWINGS

Further details of some embodiments of the present invention are explained with the help of the attached drawings in which.

DETAILED DESCRIPTION

Figures 1, 2:
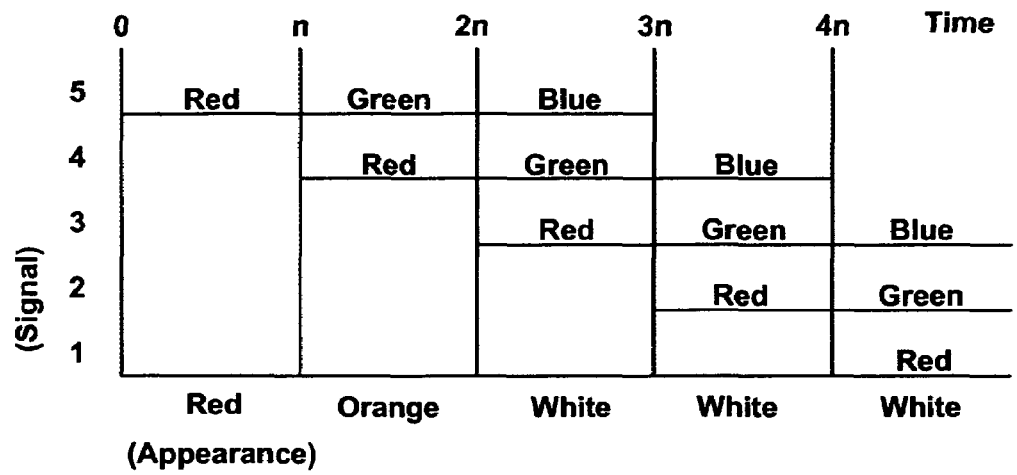
FIG. 1 illustrates a step change in color for several spots in close proximity.
FIG. 2 illustrates a numerical method or filter for relating previously co-located or close together spots.

Definitions:
The following terms as used in this application are defined as follows:

"Convolution" means a mathematical process whereby input data is filtered using a convolution kernel.

"Convolution Kernel" or "Kernel" means a set of values used in a convolution operation. Different values are used to create filters.

"Data Frame" also known as "Multidimensional Representation of Biological Data" also known as "Function Transforming n Signals Into m-Dimensional Spatial Representation" means a set of data stored in a storage device that was obtained at a particular time. A data frame may be multidimensional data set. For example, a single image on a movie projector film would be a data frame. The data can be discrete or continuous in both time and space.

"Dimension" is a mathematical term where the number of dimensions is equal to the number of variables required to represent the data.

"Display" means a device for presenting visual spatial information.

"Display Frame" means a visual representation of a data frame on a display. For example, the image on a movie projector film becomes a display frame when it is projected onto a screen. The display frame can be different from the data frame depending on how you set up the projector; if the screen is close you get a small image and if is far away you get a big image similarly if you tilt the screen you get an image that is stretched at one end and compressed at the other.

"Finite Impulse Response Filter" or "FIR" Filter means a method of digital filtering in which a set of one or more previous inputs are scaled and added to the scaled input to the filter.

"Infinite impulse response filter" or "IIR" Filter means a method of digital filtering in which a previous output from the filter is scaled and added to a scaled input to the filter.

"Processed Data Frame" means a data frame that has had data within it that has been altered or converted, scaled, or otherwise operated upon to produce a data frame more suitable for presentation to a user. For example, a processed data frame can include data that has been modified to highlight differences of physiological or biological relevance. Also, a processed data frame can contain data to highlight important relationships between physiological or biological data.

"Scaled input" means an input multiplied by a constant.

"Spot" means a location on a display visually distinct from its surroundings.

"Transforming" means putting a signal through a mathematical function the result of which is a different representation of the same information contained in the signal, for example, a Fourier transform from the time domain to the frequency domain or a moving a one dimensional signal into a two dimensional representation.

Description of Embodiments of the Invention

Rapid, real-time analysis of biological and physiological phenomena are of increasing importance in therapy for a variety of diseases and conditions. In many cases, therapy is applied according to a standard protocol, in which the therapy is delivered at one time and the effects of therapy are observed at a later time. In some cases, such as with administration of rapidly acting drugs, a response of a patient can be observed during or soon after administration of the drug. By way of example only, administration of drugs to correct cardiac arrhythmias (e.g., nitroglycerine) can have rapid effects. In cases in which the drug is potent and can have undesirable side effects, it can be desirable to monitor the effects of the drug during its administration, to avoid administering too much drug. By real-time monitoring, one can avoid undesired toxic side effects and effects that are too great. Additionally, real-time monitoring can be used to aid in diagnosis of disease or physiological condition.

The types of biological or physiological responses that can be desirably monitored in real time are not limited. For example, measurement of muscle tremor, heart rate, electrocardiographs, muscle electrical activity, blood flow and other physiological variables can aid practitioners in providing a correct amount of treatment for disorders and physiological conditions. However, it should be noted that the above are only examples of useful physiological or biological information. Many other types of information can be desirably used with the systems and methods of this invention.

Thus, in certain embodiments of the invention, sensors can be used to measure such biological or physiological phenomena. For example accelerometers, voltage sensors, current sensors, force sensors, temperature sensors, or thermal imaging cameras can be used to detect and convert biological phenomena into an electrical signal that can then be transferred to a processor for analysis and display of information.

Signals can be acquired as analog or digital information, either from instruments or from computer storage. These signals can then combined together using mathematical methods into one or more multidimensional representations, or data frames.

Data frames can then further processed to highlight differences between unrelated events and related artifacts in the signals. As a result, useful relationships between events can be more easily discerned by a viewer. Data frames can then be mapped into display properties of a display device to produce a displayable data set or display frame.

Types of analytical tools can be applied to signals. Such tools can filter input signals, quantify frequencies within a time-dependent signal or perform other tasks to provide useful information.

A display frame can then be presented on the display device for the viewer. This process can be repeated either continuously or discretely, depending on the nature of the incoming signal and the device or computer implementing the processing.

Biological Phenomena

Embodiments of biological phenomena used by systems and methods of this invention can include, by way of example only, limb movement, acceleration, heart beat, electrocardiograms, myograms, muscle tremor, limb rigidity, muscle activity, local temperature, local blood flow. It is not intended that the previous list be inclusive. Rather, it is intended only to illustrate some of the biological phenomena susceptible to measurement and data analysis.

Sensors

Embodiments of this invention can include sensors to measure biological phenomena and generate electrical signals to represent the phenomena. Embodiments of sensors used can include accelerometers, voltage sensors, current sensors, magnetic field sensors, temperature sensors, force sensors, pressure sensors, elctromyograms, electrocardiograms, and electroencephalograms.

Data Signal Acquisition

Embodiments of the step in which the signals are acquired can include signals from one dimensional analog or digital signals as well as multidimensional data such as image data obtained, for example using a camera, such as an infrared camera. Examples of one dimensional signals sources include electromyogram, electroencephalogram, electrocardiogram, accelerometers, force sensors, light sensors, temperature sensors, microphones, spectrometers, voltage sensors, current sensors, and magnetic field sensors. Examples of multidimensional signals include CCD sensors, CMOS image sensors, thermal imagers, imaging spectrometers, and scanners. Regardless of the type of sensor, acquired signals can be represented as voltages or other electrical variable(s).

Signal Transformation to Data Frames

Embodiments of the step in which signals are combined into a multidimensional data frame can include the following. A simple X-Y plot can be produced where one signal is used for the X-axis information and the other is used for the Y-information. An X-Y plot can be expanded to include more axis to accommodate more signals. For example a 3 dimensional X-Y-Z plot can be used for 3 signals. A data point can be held in a data frame as having a different property than the background points. For example, in some embodiments, a data point can be represented in a data frame as "white" or having a "color" and the background points in the data frame can be black. It can be readily appreciated that any other combination of properties of data points and background points. Thus, this invention is not intended to be limited by the particular type of property. To create a multidimensional representation of biological data, an algorithm such as joint time-frequency transforms, a wavelet, or a Short time Fourier Transform with different windows can also be used.

Processed Data Frames

A data frame can be scaled and combined to produce a new data frame (a processed data frame) through operations such as addition, multiplication, division, subtraction, logarithms, exponentiation or other operator. A processed data frame can be used as an input for a subsequent step to produce a further processed data frame. Additionally, data on one plane (e.g., X-Y) can be combined with other data on another plane (e.g., Y-Z) to form a multidimensional plane in a graphic representation. Such planes can be placed at different angles and mathematically projected on to each other. Similarly, planes can be placed into a higher dimensional space and an operation such as addition, multiplication, division, subtraction, logarithms, exponentiation or other operator can be used to combine the planes to fill the whole space available for display. For example two two-dimensional planes can be placed on two adjacent surfaces of a three-dimensional cube. Each point in the two dimensional image can be extended up through the cube as a line. Where the lines intersect the data can be combined through addition, multiplication, division, subtraction, logarithms, or exponentiation or kept as two distinct values at that three-dimensional point. This method can be used with more two-dimensional inputs on other faces of the cube. The method can also be used with shapes different than a cube such as a sphere, pyramid, or other surface. The method can be extended to higher dimensional data sets as well.

An example of an algorithm that can be used for this processing is as follows. A series of multiplying values can be created to determine how much influence each preceding data frame contributes to the new processes data frame. Each data frame can be stored for use at a later time. In a simple case multiplying values get smaller the older the data frame. Each data frame can be multiplied by a corresponding multiplying value. A data frame can be multiplied by a value by multiplying each X, Y value in the data frame by that value. Multiplied data frames can then be added together by adding each X, Y value to the same X, Y value in the other frames to create a single data frame with all the weighted information. Another example of a similar algorithm uses previous output data frames with the multiplying series instead of previous input frames. An example of another method would be to use a multiplying value for red, green and blue value set for each data frame. A data frame can be multiplied by a red, green, blue value set by multiplying each X, Y value in the data frame by a red value from a red, green, blue value set to create an X, Y red value then repeat with the green and blue values to create a data frame that contains at each X, Y value a red, green, and blue value. A set of red, green, blue multiplying values can be created to have the output data frame indicate the age of the signals by their color. For example, a red green, blue set can be chosen with all three values equal for the newest input data frame. For each earlier data frame the blue value can be decreased until its value is zero. Then the green value can be decreased until it is zero and finally the red value can be decreased until it is zero.

Methods discussed above can also be used to include multidimensional signals such as images or three-dimensional position data. To illustrate time-dependant change, one of the potential signal inputs can be the output from a previous iteration of an algorithm. For example, if a previous output is combined with a current input an effect similar to an infinite impulse response filter can be achieved where each output contains information relating to the history of the individual signals. Similarly, several previous input signals can be the input to an algorithm to produce an effect like a finite impulse response filter where the output contains the combination of several previous inputs in addition to new inputs. Previous methods can be used separately or in combination to produce a multidimensional representation, or data frame, of the combined input signals for further use.

One example of processing that can be performed on a data frame involves the use of image convolution techniques over time. One example of a method using image convolution can involve the current data frame and one or more previous data frames. A set of convolution kernels one for the current data frame and on for each previous data frame. Each frame can be convolved with the respective convolution kernel. Data frames resulting from this set of convolutions can be added together to create an output data frame. One example of a set of convolution kernels that can be used are three by three kernels where each kernel is a set of values that represent a sampled Gaussian curve. The sum of all the values in the kernel added together is an exponentially decaying function where the value decays the older the data frame is.

Another example of an image convolution can use previous output data frames instead of previous input data frames. A similar set of convolution kernels with Gaussian curves and exponentially decaying values can be used. Convolved data frames can be added together to produce an output data frame. A combination of the two techniques, previous input data frames and previous output data frames can also be used.

A data frame can also be processed using one or more algorithms intended to increase the contrast between relevant information and unimportant artifacts and to highlight relationships between the component signals. Embodiments of the processing steps used include one or more of the following. The method of image convolution can be applied to a two-dimensional display frame to blur, sharpen or some other filter on the data frame. The convolution kernel can be 3×3 or greater or continuous for use with analog image data. Similar filters such as a median filter or other nonlinear filters can be used. These filters can easily be extended to multiple dimensions by creating a convolution kernel with the appropriate number of dimensions. Like the previous step earlier inputs or outputs can be included in this the processing. For example, the convolution kernel can be extended to add pixel information from the previous output or previous inputs. The effect of this process is to put the new data frame through a convolution and previous input data frames and/or output data frames through separate convolution filters and then add them together. This data to affect the output depending on the length of time since it was received. A simplified method would be to add, subtract, multiply, divide, log, or exponentiate the previous output with the new processed input to generate the new output. Combining processed inputs and output from different times is a simplified case of the broader convolution-time algorithm above. In addition to these methods a threshold can be performed where any data with values in specific ranges can be set to a fixed value based on the range. The processing during this step is intended to make the information in the data frame easier to interpret.

Display Frame

A data frame can then be further processed to provide a representation that is displayable on a display device, or a display frame. Embodiments of suitable processing steps to change the representation include the following. In some embodiments, a color can be assigned to a value in the data frame that match the displayable colors on the display device. A color can be chosen to provide contrast between relevant sections of the display frame. For example, a shade of blue can be used to represent data frame values in a specific range. A shade of red can be used to represent an adjacent range of data frame values. Use of red and blue can create an easily visible place on the display where values change from the blue range to the red range. The range of displayable colors and intensities on a display device may not match the range of values in the data frame. The range of values in the data frame can be scaled using multiplication to fit to a desired degree into the range provided by the display device. Similarly values in a data frame can be scaled using a polynomial to stretch one or more sections and compress one or more others to fit the values in to the range provided by the display device. In some cases, only a small section of the data frame may be relevant to the user. A data frame can be shrunk, expanded, and distorted mathematically to present certain regions as larger in the display frame. A data frame that has more than two dimensions can be sliced with one or more planes to produce a two-dimensional data set that can then displayed. A plane resulting from slicing a data frame can be flat, curved, with stair step changes, or any other desired shape. Sliced data can be flattened or projected on to a flat plane for display. Using these and similar methods, a data frame can be separated into one or more display frames for display on one or more display devices. A data frame can be processed to create the display frame to make optimum use of the display device capability.

Display

A display frame can be presented on a display device for the user or recorded for later use. A display device can be a cathode ray tube (CRT), liquid crystal display (LCD), light emitting diode (LED), organic LED, digital light projection (DLP) projection, plasma, or electronic paper. One or more displays can be used to provide enough display space to display the relevant information to the user. The above particular display devices are not intended to be limiting. Other types of display devices can be suitably used using the systems and methods of this invention. Regardless of what type of display device is used, a display frame can provide one or more "spots" in the frame. Each spot can represent one value of a biological or physiological variable. In some cases, signal processing programs can be used to alter signal points in a fashion that is convenient for the user.

Interpretation of a display frame can be accomplished by the user or by continued computation of some element or elements of the display frame to detect threshold limits for another action, such as an alarm.

Enhancing Visibility of Selected Data Points

Embodiments of the present invention can intensify the visibility of clusters of signal points, or spots, in a multidimensional display space (display frame) with a spot being a small group of signal points visually distinct from their surroundings. A small cluster is a "spot" as seen by the eye that can be interpreted based on the color and intensity of the signal points that make up the spot. Signal points and spots can aggregate into clusters that can have noticeable characteristics including intensity, color, texture, area extent, patterns or any combination of these and other characteristics that provide contrast from a random noise background.

Using embodiments of the present invention, many numerical methods can be applied to enhance the display data indicative of a function over time. For example, an analog decay function provided by an oscilloscope can be simulated digitally using a computer display to create an image or "spot" that can decay steadily until it is gone. A cluster of related spots can be further displayed to build and stabilize in intensity on an oscilloscope, or other display, with additional spots becoming illuminated as more data is presented in the vicinity of the original spot.

Further techniques such as changing color over time can be applied to data points to indicate time and intensity of data values. Variation of color over the display time provides useful information to the user. When a cluster appears to stabilize over time or otherwise becomes a recognizable pattern, it can be interpreted as a commonly occurring event. Color and intensity can be varied over time to combine the functionality of both while limiting the time that the spot remains part of the extended data set (i.e. visible). Time can be considered a dimension as part of a multidimensional computation of display spots.

A common method for presenting any color in the monitor color space includes adjusting the ratio and intensity of the red, green, and blue light emanating from the display. Certain colors, such as "white," can be made up of relatively high intensities of R, G & B mixed together or in close proximity to each other. The human eye and brain mix and interpret color and can detect small changes in apparent color. The apparent intensity and color of a particular spot is also affected by the intensity and color of the adjacent area, or display spots. Computations can be applied to adjust the intensity and color of each spot to account for the surrounding area characteristics. These adjustments can represent additional "dimensions" in the multidimensional display space.

FIG. 1 shows a simple step change in color after "n" seconds, 2n seconds, 3n seconds and 4n seconds. An initial red spot is received at time 0 with a highest intensity of 5. A second step change is made after n seconds where green light is introduced at an intensity of 5, while the red light decays to a value of 4, creating an overall orange color on the display. A blue spot is introduced after 2n seconds at intensity 5, while the green and red spots decay, but have sufficient intensity to combine to create a white display spot. After 3n seconds, no additional spots are introduced, and the intensity of the remaining spots in close proximity still create a white light that continually decreases in intensity. The case shown in FIG. 1 is interesting because it shows clusters will "brighten" or become white when non-random information is displayed. The time "n" can be adjusted to remove much of the noise associated with random data by increasing the time decay effect of each spot relative to new spots appearing in proximity.

To enhance the ability to use color or other means to display functions, numerical methods are used to filter related data. To represent time, for example, a filter, such as smoothing, can be applied to change the display of data points after the data points are first placed on the screen by changing color, size, or intensity. Specific examples of numerical techniques to enhance the display of data are described to follow.

As an example, a multidimensional convolution or nonlinear filter, such as a Gaussian or a median filter, can be used on data to reduce "noise" in an image. The filter can be adjusted for size and effectiveness by calculating each data point with a numerical association with nearby points. Typical filter sizes have 3×3 or 5×5 pixel sizes. Other types of filtering can be used to improve the visibility of non-random data by excluding or diminishing the influence of random data. Computations can alternatively be analog (non-digital) and then be displayed on an "analog" display, such as an XY oscilloscope. The terms "spot" and "pixel" can be considered to be independent of "analog" or "digital" or other means of computation or display.

Another example of a numerical method for enhancing data display is the use of computed data to create an entirely new display of the information. FIG. 1 shows that spots in proximity that are being added at a rate of "n" will tend to build an appearance of "white" while areas that do not have the "build" rate of "n" will appear as some other color. Numerical methods can be used simultaneously to explore a large set of "n" values to maximize the range of colors used, rather than letting the colors blend to white. Processing can detect related events by monitoring the R, G, and B (or other color space) ratios to build a new display of points that meet some specified conditions resulting from non-random data. Multiple processing methods can also be used in real-time to find and mark related events that can be reviewed later.

Figure 11A:
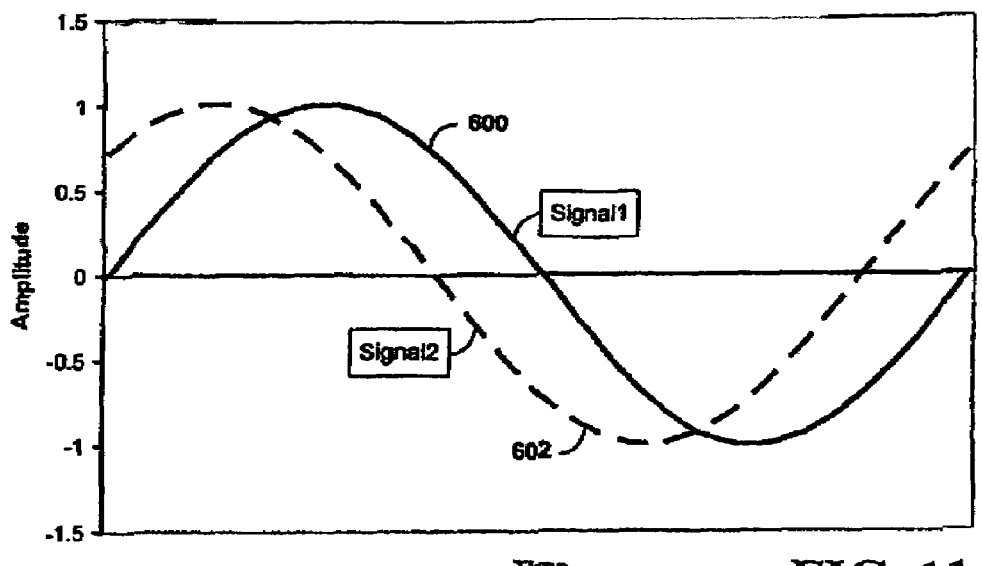
FIG. 11a illustrates an example of a graph showing a display of two signals simultaneously versus time.
Figure 11B:
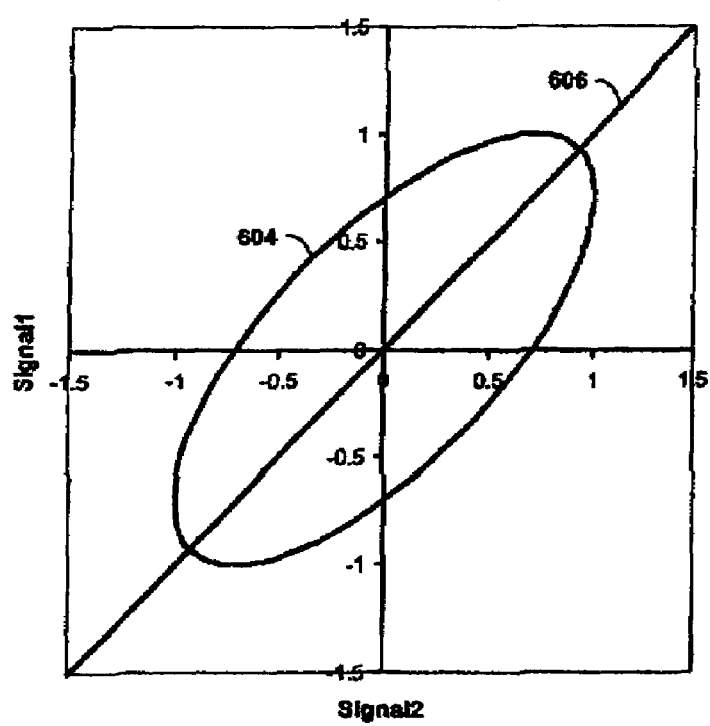
FIG. 11b illustrates an example of a XY display showing the phase relationship between 2 signals.

Underlying signal data may be recorded for review and later processing by multiple methods. Simultaneous real-time processing using several methods with concurrent display can permit the user to rapidly find related data when specific best processing methods can not be predicted. For example, during-treatment monitoring and simple display of some of the many possible physiologic responses possible from a given therapeutic treatment can be difficult for the practitioner to find related information. Embodiments of the present invention permit the user to "see" signal relationships directly that can not be seen by separate viewing of each signal. For a simple example, Lissajous patterns readily allow the viewer to recognize phase relationships between two signals having related frequencies. Physiologic responses may require multi-dimensional modeling to describe each response because of the complexity and number of independent or "slightly" related possible responses. FIG. 11. illustrates a Lissajous pattern 604 that results from the xy display of signal 1 600 and signal 2 602 that are 45 degrees out of phase. The line 606 shows the axis of an ellipse representing the phase and magnitude differences between two signals having the same frequency 600, 602.

Another example of a numerical method relates previous co-located or close together spots with each new spot or data point in a xy display. The intensity of each spot is calculated based on the time that nearby spots have remained before being extinguished after time "x." In some embodiments, a simple method is additive, by filtering nearby spots using a median filter while allowing each spot to decay linearly over time to determine the value of the current spot before adding in the value of a new overlying spot. This method effectively creates an image composed of the intensity of a given spot based on the history of that spot and the histories of nearby spots plus the preset starting value for the new spot. This method intensifies the spots and clusters of spots relative to the background spots.

FIG. 2 illustrates this numerical method of filtering with a 3×3 filter to relate previously co-located or close together spots. The numerical method achieves intensification of a data value in an area by combining a filter value with an incoming value. For each single spot value, a center spot value $e_1$-$e_3$ is calculated based on the value of its neighbors and then added to the value of the incoming data point. Subsequent frames are calculated on the decaying values of each spot. A 3×3 matrix is shown in this example. It can be appreciated that larger filters can also be used.

In the first time frame $t_1$, the initial center spot $e_1$ is shown surrounded by spots a, b, c, d, f, g, h and i. The initial signal $e_1$ may be no signal, or a specific signal with an intensity value. In the next time frame $t_2$, a calculation is performed to set the value of $e_2$. If a signal is detected between $t_1$ and $t_2$, then the value for $e_2=calc(e_2)+e_1$, where $calc(e_2)$ is determined from a formula which combines the signal value received for $e_2$ with its neighbors. If no signal for $e_2$ is received between $t_1$ and $t_2$, then the value for $e_2=calc(e_2)$ as determined from its neighboring spot values, if any exist. If all pixels have decayed between $t_1$ and $t_2$, then the spots will all disappear, or no formula is applied. Similar steps are applied between time frames $t_2$ and $t_3$ to determine a value for $e_3$.

Another example of a numerical method to highlight linear and cluster relationships in n dimensions uses a best-fit technique. For every point or spot in an n dimensional space, a line is calculated where the line intersects the spot and is a best fit for the given data. For a given set of data signals, the lines should point toward the most correlated data. The direction from the point along the line toward the most data points can then be calculated. The line and direction can be used to generate a vector field, contour map or other display that indicates a trend toward highly correlated data locations. The quality of the best fit from each point can be separately displayed from quantity data to highlight numerical relationships between data spots. Data spots can be given different "weights" or multipliers, depending on the length of time since the data was received or generated. Similar methods for best fitting data can be used for non-linear curve fitting.

In one embodiment of a best fit calculation, for every point in an n dimensional space, the distance between the point and all data points can be calculated and displayed to show locations of high density. The distances can be combined in a number of ways. The simple summation of all the distances is the simplest way to determine the point display. Least squared methods, probability density methods, distance variance, and other methods can also be used.

In a further numerical calculation, techniques are applied to use the time history of every data point. Given the number of data points in a region versus the total number of data points in the same time span, it is possible to calculate the probability of new data falling in the given region during a certain time period. Various methods can be used to generate the regions of interest including circles, ellipses, squares, rectangles, or other geometric shapes. Various statistical methods can be used to determine the probability of occurrence of spots in these regions.

Numerical calculations are used according to the present invention to manipulate and display one or more signals indicative of an event. The numerical calculations accomplish transforming one or more signals into a spatial relationship of two or more dimensions, before the spatial relationship is further processed for display to highlight important features to a viewer.

Figure 3:
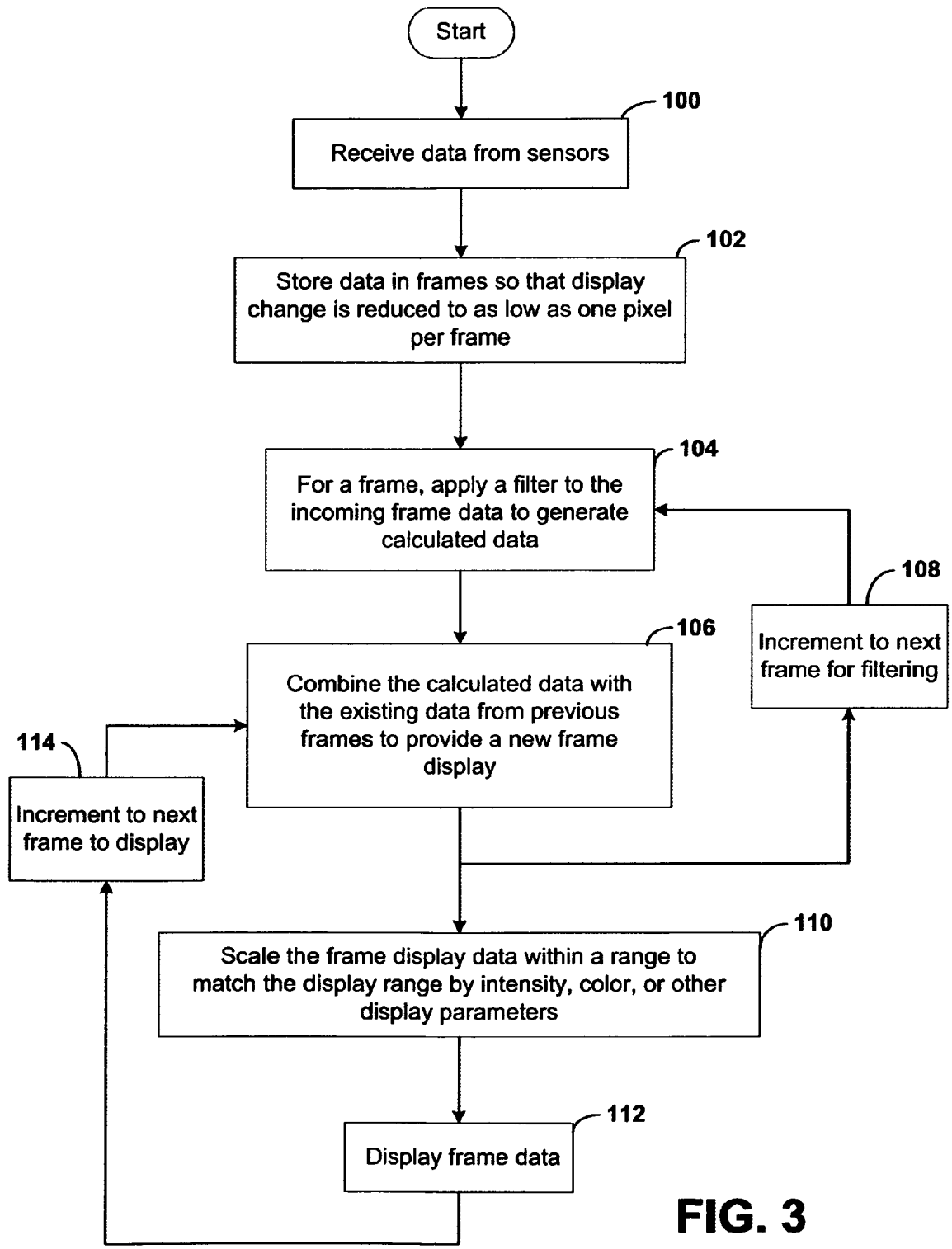
FIG. 3 is a flow diagram illustrating a method according to the present invention for enhancing the display of data.

FIG. 3 shows a flow diagram illustrating a method according to embodiments of the present invention for enhancing the display of data. Initially in step 100, data is received from sensors, such as a SMEG and accelerometer. In step 102, the data is stored in frames. The frames can be spaced with a relatively short display refresh rate so that a change in spots, or pixels, can be reduced to as low as 1 spot per frame. A frame can be considered one cycle of data collection, reduction, calculation, etc. The frame size can be chosen to enhance the contrast between clusters or related data and background noise. A simple threshold for displaying accumulated data can eliminate spots that have not had frequent additions. The goal of the display is to communicate changes over time and hence many methods can be used to increase the contrast between random and non-random signals.

In step 104, for each frame collected a filter may be optionally applied to generate the calculated data. The filter may be a filter similar to the 3×3 filter described with respect to FIG. 2, or another numerical method applied to smooth the data. In a further step 106, a formula, such as addition, multiplication or time dependent function is used to combine the calculated data with the existing data for in the spot in a previous frame. For example, addition can be used as described with respect to FIG. 2 to create a spot value $e_2$ from the filtered value for the current spot, $calc(e_2)$, added to the previous spot value $e_1$, such that $e_2=calc(e_2)+e_1$. In this manner, a display spot contains a cumulated history of data starting at some initial time. Should no new data spots be available for the frame, no further data will be displayed, as described with respect to FIG. 2, allowing the data previously displayed to decay over time.

After step 106, data is sent to step 110 to prepare for display, and a next frame is chosen for data processing in step 108 with control sent back to step 104. The display process is generally much slower than the data rate. Therefore, the transforming process from the accumulated history for each spot does not have to be done at the data rate.

The display process begins in step 110 with the data for display being auto scaled within a range of data to match the display range by intensity, color, or other display parameters. For example, scaling for color can be performed to allow color to show data changes, rather than for color to merge to a white color as illustrated with respect to FIG. 1. In one method to set the data within the display range, the largest and smallest valued spots for several frames are found. The smallest to largest value spot data range is updated to match the range of the display intensity and color range. Once data is scaled for display in step 110, the frame of data can be displayed in step 112. Once a frame is displayed, control is provided through a feedback step 114 to return to step 108 and allow another frame of data to be displayed.

To focus the attention of the observer on the useful display range, a number of methods can be used. Only certain portions of the intensity, color, spatial or other display parameter will contain meaningful data. By determining these meaningful areas within the display range, minimum and maximum values for the display parameters can be determined, and the scale of the data to be displayed can be adjusted so that it fills the entire meaningful range rather than a smaller portion of the entire display range. Stretching and shifting of a display function can be linear, non-linear, logarithmic, exponential, polynomial, or other curve fitting algorithm depending on the data being displayed.

Long duration data received from a sensor may contain a DC level shifting over time that can cause data being displayed to drift outside of a meaningful display range. This drifting effect can be limited in a number of ways. In one way, the displayed values can be a difference between the data and an average of the signal over a time window. Further, the drift amount can be measured and subtracted out using data manipulation prior to providing the data for display. Sensors may have one or more characteristics, such as sensitivity, noise, or off-set that change over time or temperature. Embodiments of the present invention can be used to improve the integrity of measurements. For example, a temperature standard can be placed within the scene of an infrared thermal imaging device to stabilize the resulting image, frame by frame or two temperature standards can be included in each image to allow two-point linearization of the image. In other embodiments, display of known reference temperature points in an imaging area can allow the user to readily judge the integrity of other points in the image based on the stability of the reference points over time.

Embodiments of the present invention can use image recognition methods to identify and highlight areas in images, such as thermal images, that change over time. The image processing parameters can be adjusted using computed data collected by other sensors. Similarly, processed image data can be used to transform data from other sensors.

Another example of a computed display consists of a frequency domain display showing both the magnitude and phase of signal components. With a frequency domain display, FFT (Fast Fourier Transform) or other frequency domain transform can be used to display signal characteristics for determining frequency shift and phase shift as a result of physiological treatment.

In another example, a resting hand tremor in a Parkinson's patient that appears as elliptical motion and is stable over time before treatment can change to linear or another apparent shaped motion during and after treatment. A tri-axial accelerometer placed on the hand with tremor can be used to measure the hand's motion, and computations can be used to optimize the apparent viewing angle for display for early recognition by the treating practitioner. Lissajous (e.g., a plot of two variables against each other on an X-Y graph) and other patterns can be used to display some aspects of the motion in two axes; the elliptical motion results from motion along two axes that have the same frequency and share a phase relationship. The magnitude of motion in each axis and phase determine whether the ellipse is nearly circular or is highly elliptical. Embodiments of the present invention can combine the motion information with electrical muscle activity information (SEMG) through processing during treatment to permit the practitioner to adjust and optimize the treatment. Some examples of treatments include treatment of specific nerves or regions, such as with Deep Brain Stimulation, or light of varying wavelength and intensity applied to the eyes or skin, or electric stimulation, such as TENS applied to the skin to stimulate muscles.

In other embodiments, the computations can be used to stimulate or inhibit muscle activity directly through electrical or mechanical intervention based on the measured motion and electrical muscle activity. This embodiment applies the therapeutic intervention automatically or under the patient's control. Processing of potentially related signals can amplify the "relatedness" of those signals for the purpose of creating non-visual presentation to the user or to the patient in the form of treatment signals. For example, light or electric stimulation can be synchronized in intensity with cardiac activity. Enhanced physiologic response can be made evident using methods of the present patent by improving contrast of related aspects of the signals.

Figure 4:
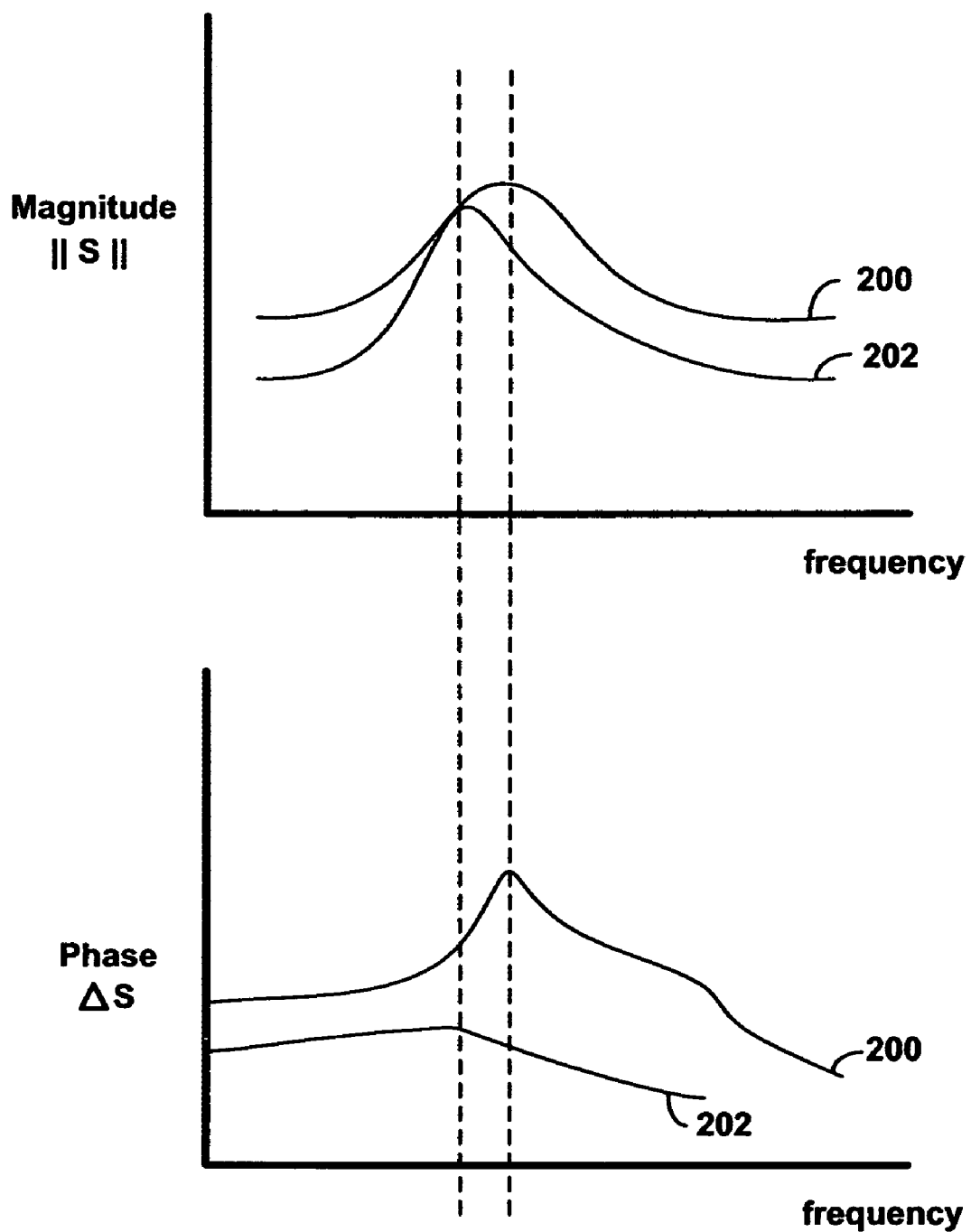
FIG. 4 shows a typical frequency domain display format illustrating plots of both magnitude and phase for SEMG signals from a muscle with a tremor.

FIG. 4 shows an example of a conventional FFT display format illustrating plots of both magnitude and phase for SEMG signals S resulting from a muscle with a tremor. The first signal 200 shows an essential tremor, while a second sample 202 shows a tremor signal after treatment for a time period T. Using a display enhanced according to embodiments of the present invention, display characteristics such as color and intensity can show changes during treatment from the time of the first signal 200 to the second signal 202, enabling a user to adjust the treatment procedure to achieve the most desirable results. Real time monitoring of signals can be achieved for treatment using light, electricity, mechanical or other muscle stimuli with the goal in monitoring a physiological response while treating with a user's early recognition that a response to treatment is occurring. Early recognition of response to treatment allows the user to continue treating, move to a new location or setting, or to discontinue treating. Although physiological treatment signals are shown, any time related signals may be processed to enhance user interpretation of data change vs. therapeutic treatment is only one example. Further, although a frequency display is used as an example for showing signals to compare over time, the numerical methods according to embodiments of the present invention can likewise be applied to create new displays of the trends in signal change.

Figure 5:
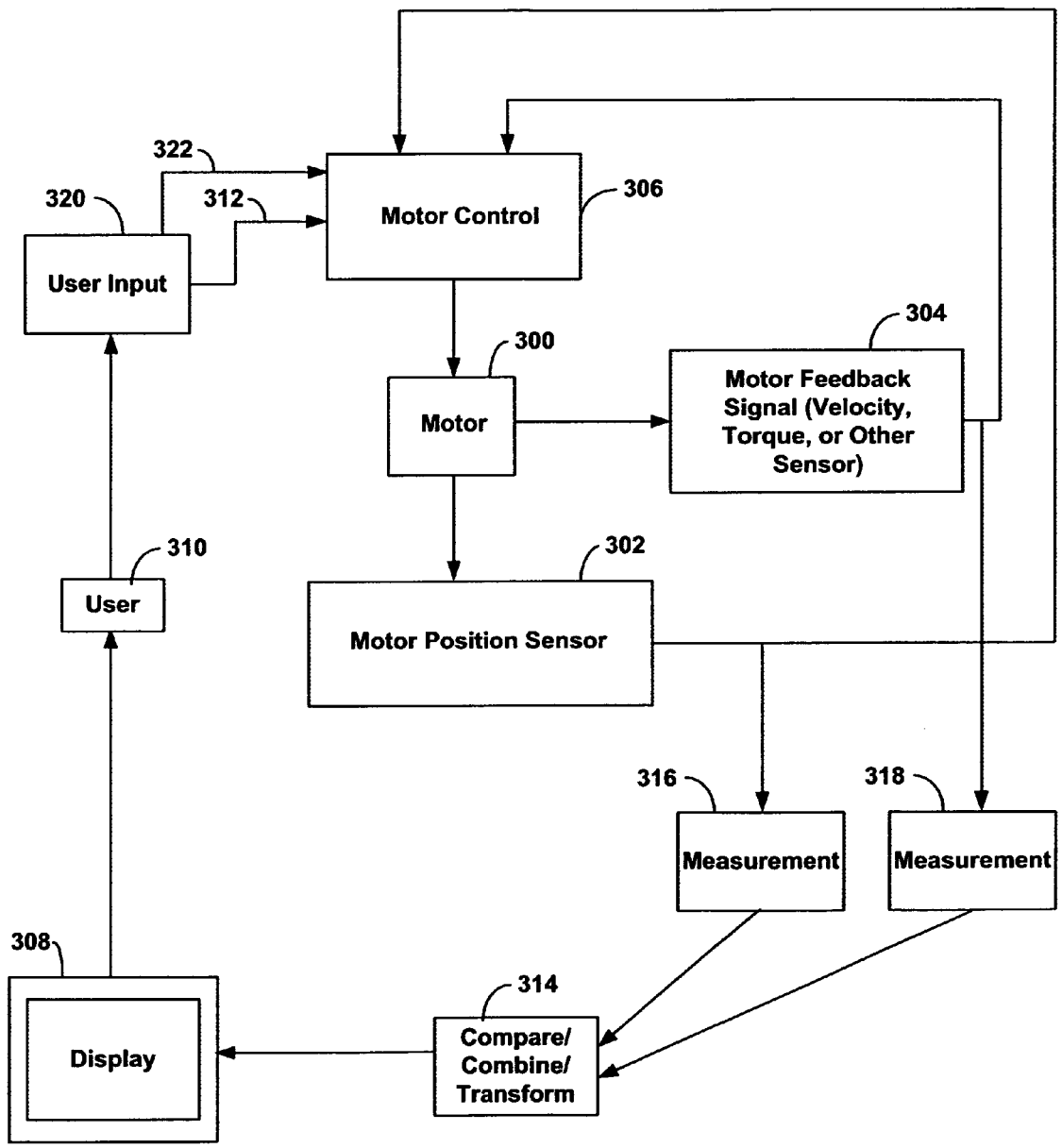
FIG. 5 shows a control system for a motor that can be related to a motor or sensory nerve that is experiencing a tremor.

Further examples of the monitoring physiological treatment using embodiments of the present invention are described to follow. For reference, FIG. 5 shows a control system for a motor that can be related to a motor or sensory nerve that is experiencing a tremor. The motor 300 can be compared to a muscle that is driven by electrical signals from nerves. The motor 300 has an input provided by a user interface 320 that can set both the motor control set-point 322 and the motor control parameters 312.

The motor 300 is controlled using feedback signals from a position sensor 302 and an motor feedback signal sensor 304. The motor position sensor 302 allows monitoring of actual physical motion of the motor. The position sensor 302 is comparable to an encoder, or other device that can monitor position. Velocity and acceleration of the motor can be derived from position vs. time information. The motor feedback signal sensor 304 monitors electrical signals within the motor such as the current, back EMF, or velocity related voltages. The motor feedback sensor 304 is partially comparable to the SEMG for monitoring electrical signals of muscles during physiologic treatment. An SEMG 532 (FIG. 6) represents the bulk electrical activity associated with muscles within the measurement region and can contain information related to muscle function as well as undesired signal components. By way of example, undesired components can be reduced in importance by means of multidimensional computations and transformations 536.

With feedback, the motor control 306 of FIG. 5 compares its set-point input 322 with the position feedback information from position sensor 302 and other motor feedback signal information, such as current or velocity, from motor feedback sensor 304 and adjusts the power control to the motor 300 according to some function defined by the motor parameter control input 312. Stability of motion of the motor 300 can be dependent on the relationships between position feedback from sensor 302, electrical signal feedback from motor feedback sensor 304, control parameters input 312, and other factors, such as motor inertia and load inertia, and the maximum power available to the motor. By way of example, different stability problems result from insufficient feedback or from excessive command input, or from insufficient power, excessive inertia. In some embodiments, tests can be performed to distinguish the source of instability using the transform between input command and the system response.

Figure 6:
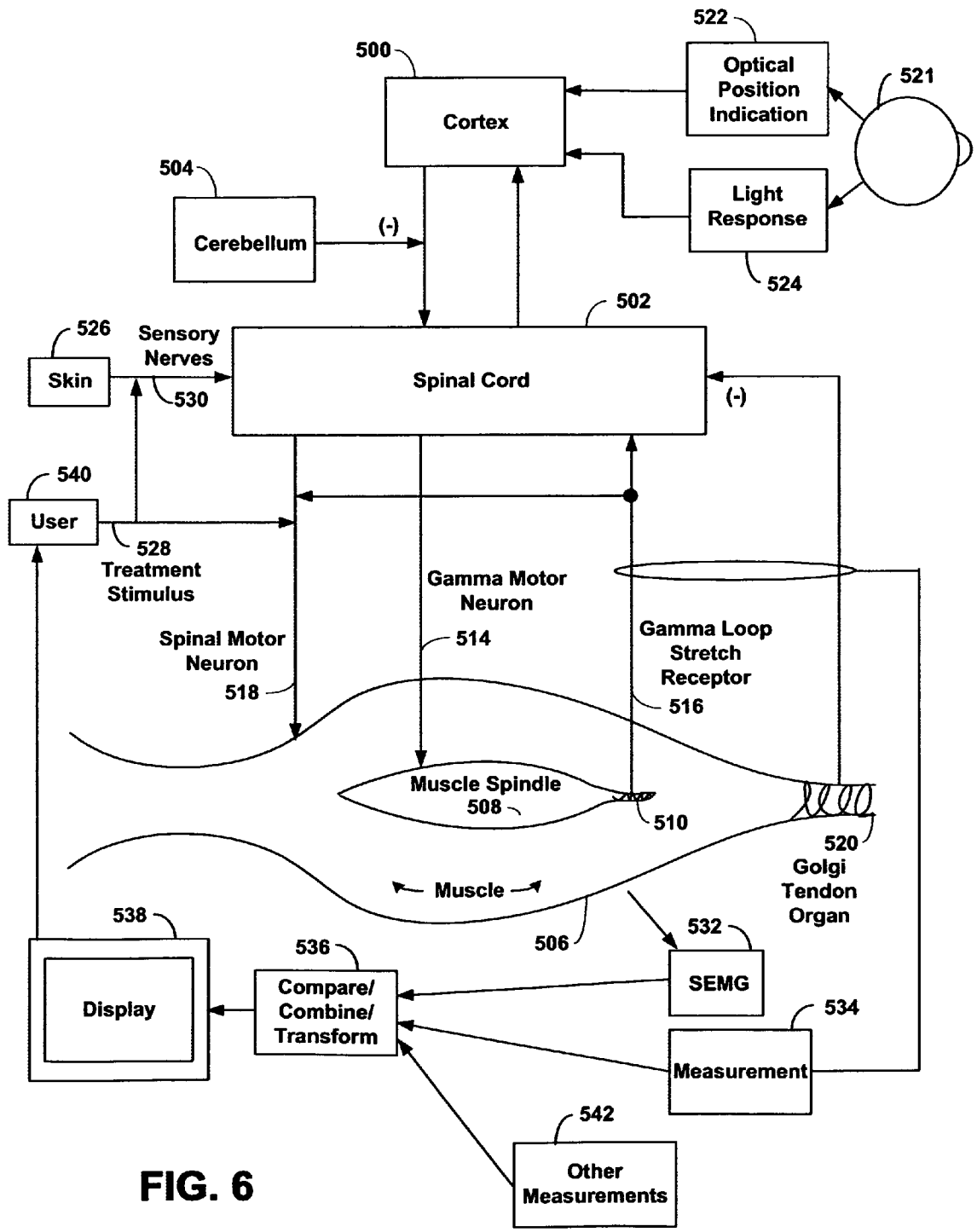
FIG. 6 for reference shows a block diagram of parts of a human body that correspond to the motor diagram of FIG. 5

Motor system performance can be compared with the system performance of intended motion of a patient's body part. In this embodiment, the treatment stimuli 528 (FIG. 6) are provided by the user interface/display 540, 538. The stimuli 528 can have characteristics similar to the motor set-point input 322 by providing instructions to the patient, for example by moving a spot on the display, that the patient must reliably track with his finger. The patient's ability to visually track the moving spot can be measured by means of eye position sensors 522 while the arm and finger motion can be measured by means of accelerometers or position sensors 542 (FIG. 6)

along with physiologic sensors, such as SEMG 532. The signal relationships can be computed 536 and transformed to be displayed 538.

The comparison in this embodiment between motor and physiologic systems as computations and transformation of measurement signals 314, 536 are used to present computed data that can be readily interpreted by the user. The user inputs 540 to the patient can stimulate muscle motion using, for example, an electric stimulation system such as a Transcutaneous Electrical Nerve Stimulator (TENS). Other embodiments can use pulses of electricity or light to stimulate a nervous system response, sometimes called evoked potentials. In other embodiments, light or other stimulation of the nervous system can cause non-movement related responses such as, skin temperature changes, skin conduction, sweating, galvanic responses, relaxation of muscles, fatigue, desire-for-sleep response, reduction of spasm of muscles, reduction of vascular spasm, reduction in pain level, increases in sensation, or other responses. Each of these and other responses can be measured, relationships computed, and displayed for interpretation by the user by providing contrast of related aspects of the collected signals. Iterative treatments can be applied, each new treatment based on observation of the patient's response to the previous treatment or treatments. In other embodiments, a negative response to any means of stimulation of the patient can be used to identify underlying pathological dysfunction.

Display 308 receives signals computed by the signal transformation 314 from motor measurements 316, 318. The display 308 is comparable to observing and monitoring computed resulting outputs of devices such as a SEMG monitor attached to the patient. The user input interface 320 allows a user to provide motor set-point inputs 322 and control parameters input 312 to the motor control 306, thus affecting the motor 300.

Set-point input 322 sets the desired motor speed, acceleration, endpoint position. The motor motion can be compared to a patient voluntarily moving a limb to a desired position along a desired path and speed. Control parameters input 312 allows fine tuning of the motor parameters to change the motor controller's response properties such as frequency, amplitude, phase or the gains associated with each aspect of motion. The control parameter input 312 functionality does not have the same accessibility in the patient treatment model. For example, if the motor is overshooting when feedback corrections are applied, adjustments of items such as phase and frequency and various gains can be made to prevent such overshoot by changing the relationships to make the system critically-damped or over-damped. Some forms of electric simulation can stimulate individual muscles or muscle groups. Embodiments of the present patent can use computed or transformed sensor data to guide direct stimulation. Indirect therapeutic treatments using light or other stimulation can provide a reduction in tremor through physiologic mechanisms that are presently not well understood.

Comparisons between muscle activity and motor/tachometer/power systems can provide a means of describing the changes to measurable or implied variables associated with motor control without requiring knowledge of the actual physiologic activity or change. For example, a stable tremor involving two muscles may reduce in amplitude in only one muscle during intended motion and a computed display can reveal the changing relationships to the viewer. Design of experiments can be used to determine whether muscle input signals, position feedback signals, or inadequate available muscle strength, or other parameters, are responsible for tremor and tracking error. Therapeutic benefit can be demonstrated by a reduction in tremor or an improvement in tracking ability without knowing or treating specific parameters. Embodiments of the present invention provide evidence of physiologic response during treatment, which does not require the practitioner to understand the underlying mechanisms of action.

Changes in particular feedback loops can affect the motor or motion disorder effects in different ways. If an over-damped or critically damped system is disturbed by a sufficient reduction in either velocity or position feedback information, then the system becomes under-damped and a stable oscillation can occur. Reduced signal feedback can cause overshoot of the intended position, which will occur repeatedly if the feedback reduction is sufficient to make the system under-damped. Embodiments of the present patent can display the similarities in response to specific input controls between patient tremors and electric motor systems. For example, a low nerve conduction velocity to the hand can contribute phase delays that affect fine movement. Treatments that improve nerve conduction velocity can improve aspects of fine motion that can be made visible through embodiments of the present invention. The motor system parameter similar to nerve conduction velocity is the phase relationship between command and feedback.

Comparing the motor example of FIG. 5 with monitoring physiological activity, for Huntington's and Parkinson's patients, the patients have to look and think to get an affected body part to the right place. In one example, two Huntington's patients being treated with light stimulation to reduce foot discomfort have shown improved gait and remarked that they do not have to think about moving each foot. The Huntington's patients exhibited stable static balance, yet had halting irregular gait while attempting to walk. After the initial treatment, the patient's feet warmed in response to treatment and both patients showed immediate improvement in gait and a reduction of thought and visual involvement in walking. One patient spontaneously told her family and the practitioner that she did not have to think about walking. An infrared thermal imaging system indicated improved blood flow to the legs and feet shown by increasing temperature of the feet over the course of the treatment. After treatment, the patient showed improved velocity and position feedback and reduced dependence on the visual loop (the patients spontaneously stopped looking at their feet while they walked). The visual feedback loop is slower than the normal intent-only control loop. Overshoot of position is a consequence of reliance on visual feedback for foot position that can be considered similar to a phase error or delay in the motor/tachometer analogy. The concepts of nested motor control and feedback loops apply to describing human movement activity.

FIG. 6 for reference shows a block diagram of parts of a human body that correspond to the motor diagram of FIG. 5. The cortex 500 of the brain provides the motor controller of the system shown, while the motor being controlled is the muscle 506. Nerve signals are provided from the cortex 500 to control the muscle 506, and feedback signals are similarly provided from the cortex 500 through the spinal cord 502. The feedback nerve signals from the spinal cord 502 correspond to the electrical feedback signals in the motor of FIG. 5. The cerebellum 504 provides a negative inhibitor to signals provided from the cortex 500, as indicated by the (−) sign.

Actual position feedback is provided visually from the eye 521 as an optical position indication 522. Sensing by the skin 526 provided by sensory nerves also gives a person the ability to determine position. Sensing can also be observed by a person administering treatment using a device such as the SEMG 532 (or needle EMG) shown connected to nerves.

Treatment such as by light, heat, electrical or mechanical stimuli to the skin 526 can affect muscles and nerves responding to treatments to control tremors or limit involuntary muscle movement. Treatment to the eye 521, such as by flashing lights or other stimulus 524 can further be used to stimulate a response to treatment monitored during treatment non-invasively using the SEMG 532 shown, or other device such as an accelerometer, thermal imaging sensor, or other device.

The muscle 506 is shown including a muscle spindle 508. The muscle spindle in turn includes a gamma stretch loop receptor 510, which when stretched sends a feedback nerve signal 516 through the spinal cord to the cortex 500. The gamma loop receptor also sends an immediate feedback signal over the spinal motor neuron 518 causing a reflex reaction of the muscle 506 to relax the muscle spindle 508. The cortex 500 can further respond by sending a nerve signal over the gamma motor neuron 514 to further set the tone to control the muscle spindle. The cortex 500 can further provide nerve signals over the spinal motor neuron 518 to flex the muscle 506 generally. Further shown with the muscle 506 is a golgi tendon organ 520. The golgi tendon organ provides a nerve signal when the golgi tendon is stretched significantly, the signal being provided to the spinal cord as an inhibitor shown by the (−) sign to temper or override signals from the cortex 500.

Although the optical position indication signal 522 and skin 526 are not used significantly, if the remaining system of signals to and from the muscle 506 are not functioning properly, as with a movement disorder patient, then the optical and skin sensory feedback becomes more critical to the movement disorder patient and must be used by the cortex to override the other feedback signals.

A Parkinson's tremor is reported to be in the 4 to 10 Hz region in many cases. Deep brain stimulation (DBS) can be used as a control signal, such as from the cortex 500, shown in FIG. 6, to damp tremor activity and is a higher frequency than the tremor. The DBS blocks the tremor servo loop and prevents the tremor from building into a full, non-treated amplitude. The DBS effect is only active during DBS treatment.

Because the stable tremor of, for example, the finger involves sensory and motor nerves, the stable oscillation can be stopped by affecting other parts of the various control and feedback loops beside loops within the brain. One mechanical analog equivalent to a stable tremor can be described as a motor-tachometer-position servo, such as illustrated in FIG. 6, which has insufficient velocity feedback related to other control parameters. Other parameters using velocity feedback for stability, such as acceleration/deceleration rate control, are also affected. Monitoring the frequency and frequency-power domains of the tremor using accelerometer or SEMG signals can provide an efficient and rapid means of testing locations and settings of stimulus, such as, light or electrical stimulation. The location of stimulation can be to the skin or inside the body such as spinal stimulation or DBS. In one embodiment, DBS parameters of location and settings can be optimized by monitoring the tremor to very low amplitudes while making adjustments to the DBS. Traditional procedures utilize a person observing the tremor and reporting changes.

Another embodiment relates to the measurement and display of rigidity of human joints of people having movement disorders that restrict motion of the affected joint. New treatments for movement disorders, such as deep brain stimulation, affect the degree of rigidity based on settings for the treatment. Current practice for measuring and quantifying the degree of stiffness involve a skilled practitioner attempting to move the affected joint and subjectively deciding the degree of severity. The present invention provides repeatable objective measurements of rigidity. Tabular or graphical display of acquired data permit presentation of the condition before, during, and after treatment. The invention provides a low cost means of refining the adjustment of location and stimulation settings during surgical installation of treatment devices. Other applications include quantification of muscle strength in people with motion deficits, such as weakness after a stroke.

In one example a patient with severe spasticity due to Frederick's Ataxia was treated with light to simulate blood flow in the patient's arms and hands. The blood flow was monitored using infrared thermal imaging to show increases in blood flow indicated by an increase in temperature. After a few treatments, as his hands warmed, the spasticity reduced sufficiently for him to resume strumming the guitar. He had previously lost the ability to control his arms to hold and strum guitar stings. His resulting increased strumming capability shows an improvement in both positional feedback and velocity feedback. Playing the guitar was observed and the patient's position control was sufficient to enable him to strum faster or slower as he desired. This case is related to tremor due to instability of both position and velocity feedback. Embodiments using a monitoring system according to the present invention can provide improved treatments for spasticity. An SEMG and accelerometer can be used to monitor changes in intended motions such as guitar strumming while stimulating sensory or motor nerves as well as other parameters. Monitoring the motion parameters using embodiments of the present invention can be used to assess the outcome of treatment in addition to providing the practitioner with information during treatment.

Figure 7:
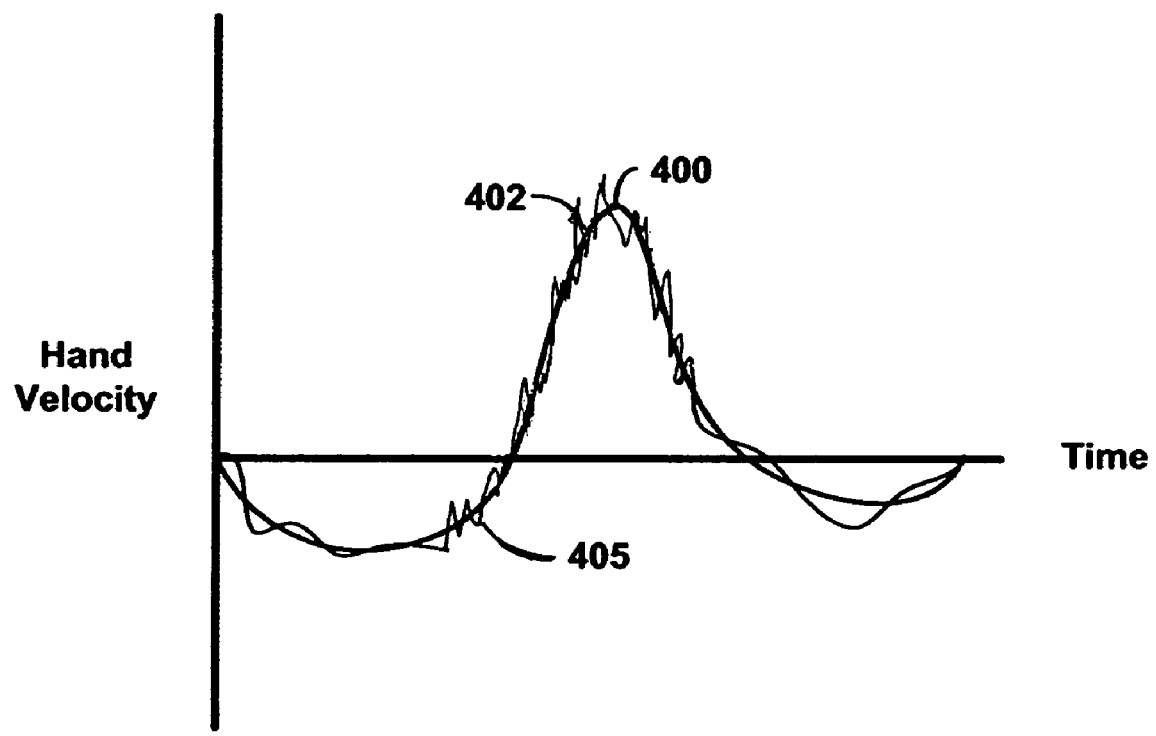
FIG. 7 is a plot illustrating hand velocity while strumming a guitar.

FIG. 7 is a plot illustrating hand velocity while strumming a guitar, illustrative of a monitoring profile. The plot 400 shows continuous motion normally required for strumming. Plot 402 illustrates a person with a motion disorder, with point 405 illustrating an out-of-control motion segment. The plot shows velocity vs. time for a strumming motion (1 strum+ return) and the characteristic velocity tracking errors which are present before vs. after treatment (with plot 400 assumed to be the intended motion without motion disorder). While the characteristic oscillations of velocity or position exist strongly, activities such as strumming or picking up an object are problematic. Tremor in an elderly person often shows up in a lightly loaded activity, such as reaching for and carrying a cup of coffee, but not as a stable tremor at rest. Each person exhibits their combinations of feedback profiles for varying conditions. Embodiments of the present invention can provide objective assessment of the degree of motion disorder over time.

Other embodiments can use generalized display formats that allow a user to select a display that characterizes the specific issue—velocity, position, rest tremor, temperature, etc. that can be monitored to provide the most effective treatment by means of early recognition of physiologic response. Families of related displays can further provide an early indication that treatment is affecting the desired deficit. Frequency domain techniques such as Fourier and wavelet transforms plus x-y plots of related muscles can be used to monitor stable oscillation tremors at rest, but provide little information about improvement of gait. Stability of cadence during walking for motion disorder patients can show day-to-day trends in performance.

One display particularly useful during treatment of tremor is the display of aging of the signal. Simple intensity fading, original color vs. current color, or more complex methods of illustration area are all possible according to embodiments of the present invention. Colorized FFT and power spectrum displays can be used to convey the history of signals before, during, and after treatment using light, electric, mechanical, acupuncture, or other stimulation.

Figure 8:
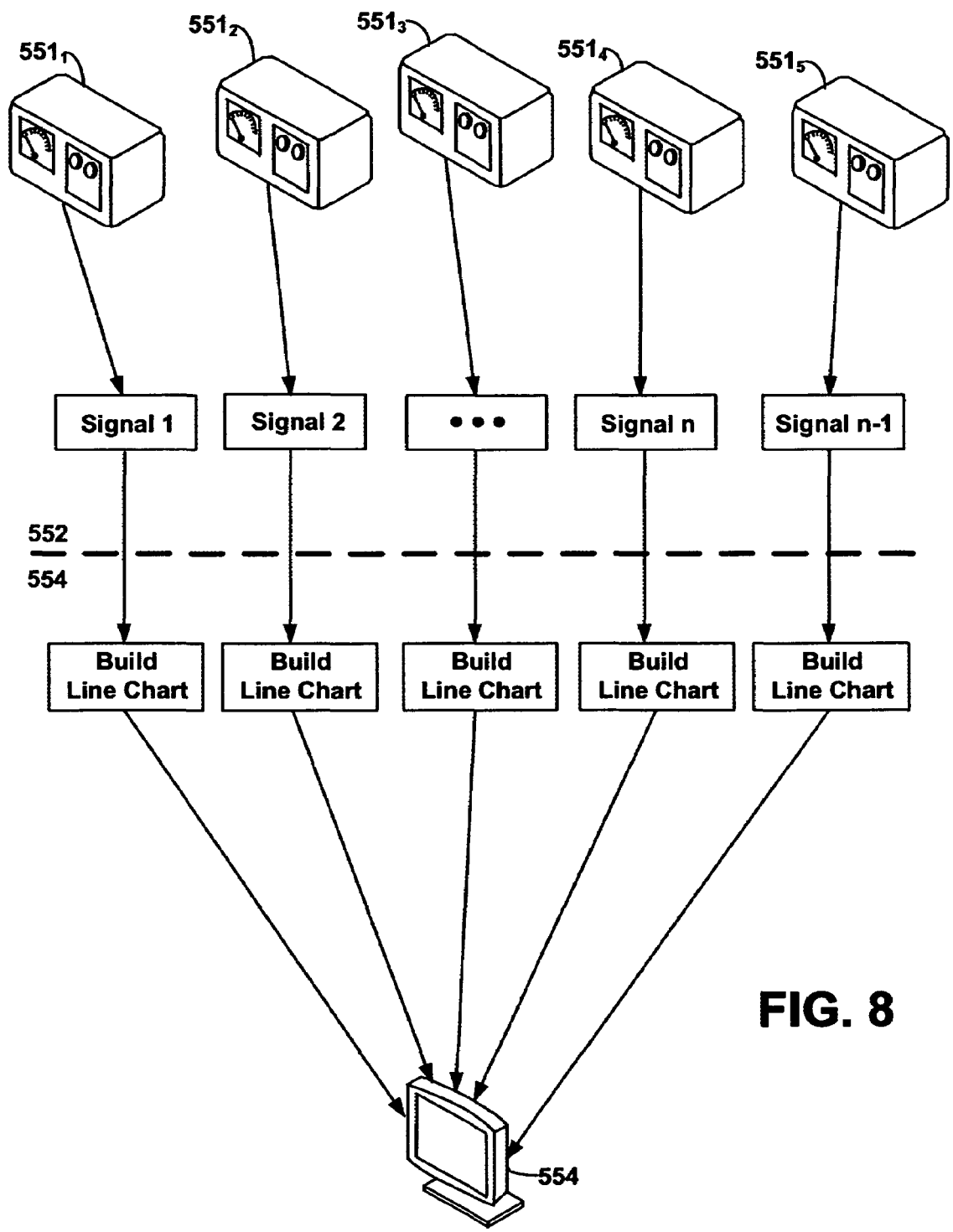
FIG. 8 illustrates a system for taking multiple data measurements, and combining the data into a line chart representation on a display.

FIG. 8 illustrates a further embodiment of the present invention, where multiple measurement instruments $551_{1-5}$ provide data to a system for display. The signals 1-(n-1) from the individual measurement instruments are processed to provide line charts for display to enable a user to rapidly compare the data results. The line charts are then combined onto a single display 554. A dashed line separates a signal gathering step 552 and subsequent data processing step 554 in FIG. 8. The measurement instruments $551_{1-5}$ can be a physiological activity measurement device, such as a SEMG, or other data gathering device according to embodiments of the present invention.

Figure 9:
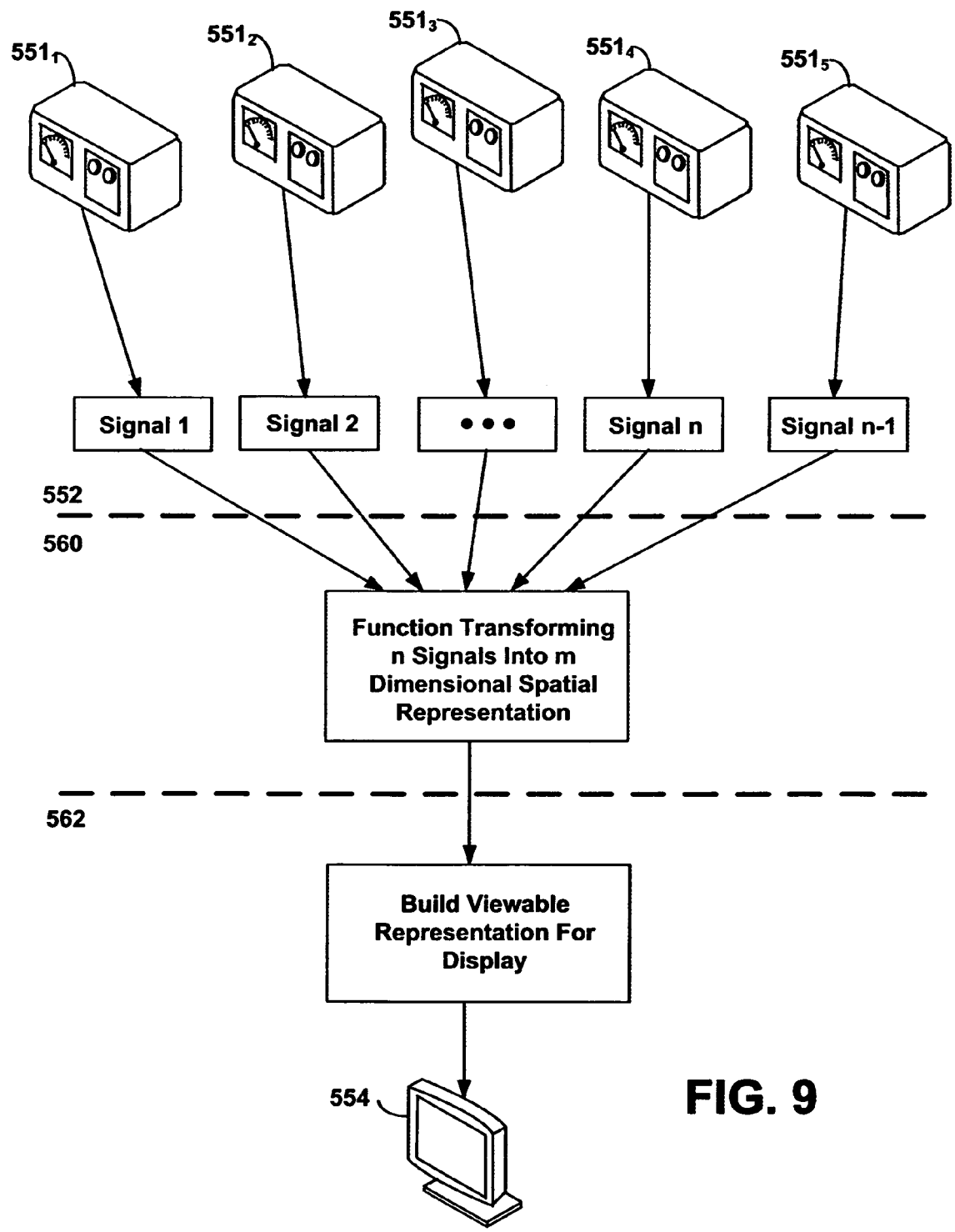
FIG. 9 illustrates modifications to the system of FIG. 8 to provide a function to transform the multiple data measurements from n signals into an m-dimensional viewing area for display to a user, where n and m are positive non-zero numbers.

FIG. 9 illustrates modifications to the system of FIG. 8 to add processing steps 560 and 562 as opposed to the step 554 of building a line chart in FIG. 8. In FIG. 9, a function is applied in step 560 to transform the multiple data measurements from a n signal into an m dimensional viewing area for display to a user. The transformed data is then built into a viewable representation for display on a display device, which may be a line chart or other graphical form of display known in the art. In one embodiment, the function compares inputs from one or more sensors indicating a response to therapeutic treatment. The compared during-treatment and after-treatment results can be manipulated as described previously with the functions effectively highlighting any responses to treatment.

Figure 10:
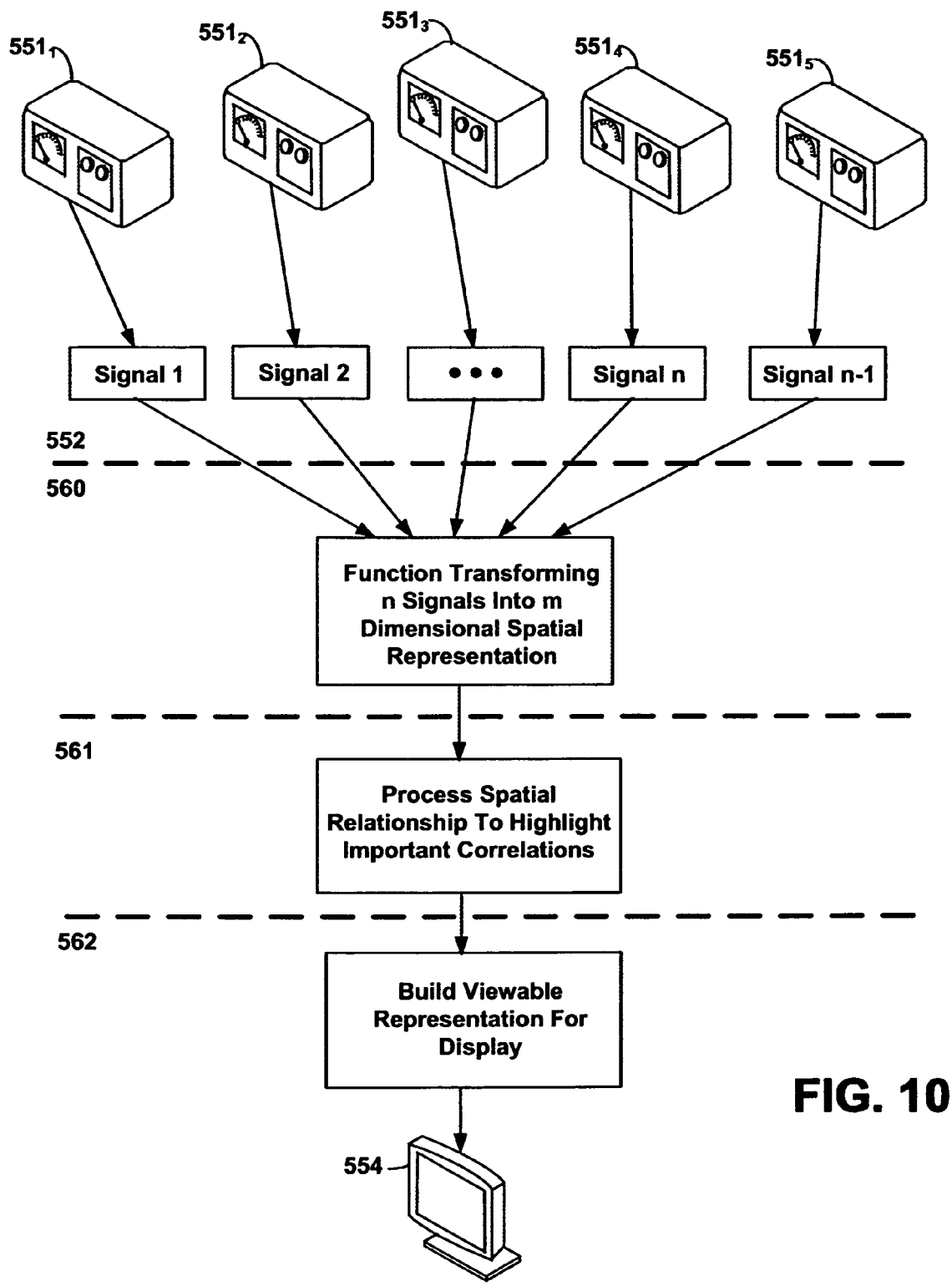
FIG. 10 illustrates modifications to the system of FIG. 9 to further highlight features for display to enhance the displayable characteristics of the signal for user interpretation.

FIG. 10 illustrates modifications to the system of FIG. 9 to add a processing step 561 to highlight features for display to enhance the displayable characteristics of the signal for user interpretation. The processing step 561 in particular when related to a therapeutic treatment can be manipulated to highlight the results of treatment. As discussed previously, the data can be fit within meaningful display ranges to highlight treatment results. Further, multiple sensor results can be separately displayed within the meaningful range to allow a user to quickly observe the results of treatment.

EXAMPLES

The following examples are intended to illustrate aspects of this invention. They are not intended to limit the scope of this invention. Rather, others of skill in the art can develop obvious variations of the examples without undue experimentation and with a reasonable likelihood of success. All such examples are included in the scope of this invention.

Example 1

Converting a Processed Data Frame into a Display Frame

We auto scale data frame values and X-axis and Y-axis space for the display colors and pixels available. A Liquid Crystal display monitor with 256 shades each of red, green, and blue (RGB) and a size of 1024 by 768 pixels is used. A data frame containing X and Y values across a range of numbers between 0 and 2, and 0 and 10 respectively.

An X,Y plane is generated using from the above data frame using X values between 0 and 2 and Y values between 0 and 10. A value at 0,0 in the data frame is assigned to the pixel at 0,0. A value at 2,10 in the data frame is assigned to pixel 1042,768. All pixels in between 0,0 and 1024,768 are assigned values from the data frame X divided by the pixel value multiplied by the pixel position. Y values are calculated using the same method. X, Y values in the data frame are assigned display colors by finding the maximum value in the display frame. A maximum data frame is assigned a maximum display value. For example if the largest value in the display frame is 6 then the RGB value [255,255,255] is assigned. Other values can be determined by using the maximum display value divided by the maximum data frame value multiplied by value of the data frame at the X, Y location. Similarly if the data frame contains red, green, blue values in the data frame the scaling can be done separately for red, green, and blue.

Display frames can be presented on a display device of devices for a surgeon performing a deep-brain stimulation procedure. By watching a display using the following example of an embodiment of the present invention a surgeon can detect small changes in tremor due to changes in stimulation allowing surgery to be completed more quickly and with greater accuracy than currently possible.

Example 2

Evaluating Effectiveness of Deep Brain Stimulation

A tremor in a patient's limb is treated using deep-brain stimulation. Two biological phenomena exhibited by a patient receiving deep-brain stimulation are the physical motion of the limb and the electrical activity of the muscles moving the limb. Limb movement is measured using an accelerometer sensor. Muscle activity is measured by an SEMG monitor. One or more accelerometers and one or more SEMG monitors are attached to a patient's limb. One accelerometer is attached to the back of a hand exhibiting a tremor using, for example, Velcro™ straps, tape or an adhesive. Similarly, electrodes for one or more SEMG monitors are attached to the muscles that are moving to create a tremor in a patients arm.

Signals from the accelerometer(s) and SEMG electrodes are acquired by digitizing and input into a computer. Signals are acquired continuously from sensors during deep-brain stimulation, and a display of motion, electrical activity of the muscles and the stimulus is provided to the practitioner.

Example 3

Image Convolution

Figure 12:
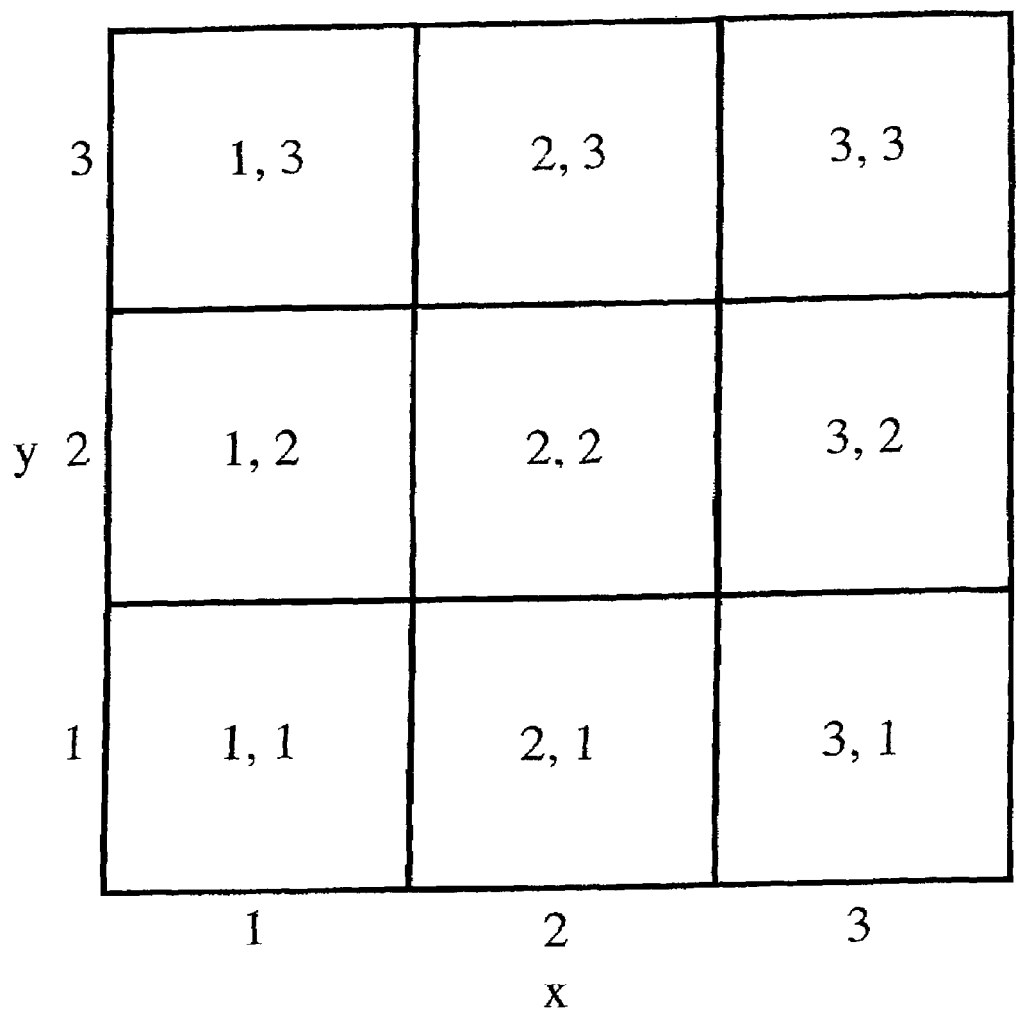
FIG. 12 is a drawing that represents a 3×3 kernel of a computer-implemented image convolution showing 9 cells with s and y coordinates of the pixels.

FIG. 12 depicts a 3×3 kernel (i.e., 3 pixels by 3 pixels) 1200 selected for image convolution. In each cell of 3×3 kernel 1200, data is represented as an X value and a Y value as "X,Y." With a 3×3 kernel, there are 9 pixels that can be labeled, 1,1, 1,2, 1,3, 2,1, 2,2, 2,3, and 3,1, 3,2 and 3.3. The X and Y values are weighting values for pixels in which they are present. Weighting values are selected by superimposing onto the kernel a Gaussian (i.e., "Normal") distribution representing the possible values of the data that can be represented by the kernel. Then, the values of the Gaussian distribution are placed into the 9 bins of the 3×3 kernel. This process of binning is also known as "descritization." Thus, kernel 1200 is a descritized form of an arbitrary Gaussian distribution selected based on the degree of smoothing is desired. Further, the differences in weighting represent differences in the possible values from the mean (or mode) of the Gaussian distribution and values farther away from the mean value. For example, it is well known that the Standard Deviation of a Gaussian function (i.e. +_1 S.D) includes about 63% of all the data points in the distribution. It is also well known that +_2 SD include about 95% of all of the data points in the distribution. Thus, a kernel of 3×3 is a relatively simple example.

Use of a pure Gaussian distribution produces a "blur" in the displayed image. To increase the contrast between areas in kernel 1200, the weighting factors are applied differentially to the different pixels. In this case, the pixel in the middle of the 3×3 kernel (i.e., X=2, Y=2) is assigned the highest weight (e.g., 1.0) because that is the location of the Gaussian mean value. Pixels on either side (and above and below) the 2,2 pixel are assigned lower weights (e.g., 0.5).

For every X and Y (i.e., each pixel in the image), we center the location of the 3×3 kernel over the 3×3 pixels, thereby producing a double-layered matrix, with one 3×3 matrix being the pixels and the other 3×3 matrix being the weighting factors for each pixel.

Then, we multiply each value in each pixel by its corresponding weighting value thereby producing another 3×3 matrix that represents a new, weighted pixel matrix. Then, we add all of these weighted pixel values together and that value becomes the new value for the center pixel for output. This process of convolution is applied further as described below.

Example 4

Implementation of Finite Impulse Response

We apply the method as described for Example 3 twice, once on a new data frame and one on the previous data frame. Therefore, there are two separate kernels. One kernel (for the current data frame) is unmodified. The other kernel (previous data frame) is modified by multiplying each of the 9 cells by 0.5 to reduce the size of the previous data frame. This method therefore convolutes the data frame over time. This method smoothes the data over both space and over time.

Example 5

Implementation of Infinite Impulse Response

We apply the method as in Example 4 using the output from the previous iteration of the convolution step. For each iteration, the algorithm takes the previous processed data frame, convolves it with the same kernel as used in the previous input, and adds it to the convolved current data frame input as described in Example 4.

Although the present invention has been described above with particularity, this was intended to teach one of ordinary skill in the art how to make and use the invention. Many additional modifications can be made by persons of ordinary skill without undue experimentation and with a reasonable likelihood of success. All of these embodiments will fall within the scope of the invention.

We claim:

1. A method of displaying real-time data on a display comprising:

acquiring data from one or more sensors attached to a human being;

storing received sensor data at one time point producing a first data frame;

storing received sensor data at a second time point producing a second data frame;

processing data using a computer implemented program to combine data in said second data frame with data from said first data frame thereby producing a processed data frame;

scaling said processed data and said first data frame to a desired range, thereby producing a display frame; and displaying said display frame on a display wherein said data is obtained from a surface electromyograph (SEMG) and an accelerometer.

2. The method of claim 1, wherein said one or more sensors captures biological or physiological activity.

3. The method of claim 1, wherein the data is from biological or physiological activity.

4. The method of claim 1, further comprising filtering said data, wherein the filter is a numerical method that smoothes the data by removing data having a frequency of greater than the frequency content of physiological data.

5. The method of claim 1, wherein the computer implemented program includes any combination of addition, subtraction, multiplication, division or a time-dependent function.

6. The method of claim 1, wherein the step of processing said data and data from said first data frame is carried out using one or more of a linear, non-linear, logarithmic, exponential or polynomial curve fitting algorithm.

7. The method of claim 1, wherein the display is analog or digital.

8. The method of claim 1, further comprising displaying data selected from the group consisting of electrocardiography (EKG), electroencephalography (EEG), body position, limb motion, local temperature, and local blood flow.

9. The method of claim 1, further comprising displaying a timing marker indicating the onset of deep brain stimulation.

10. The method of claim 1, further comprising displaying an image.

11. The method of claim 10, wherein said image is a thermal image.

12. The method of claim 1, wherein said computer-implemented program highlights a display of relationships between said data.

13. The method of claim 12, wherein said computer-implemented program is an image convolution program.

* * * * *